(12) United States Patent
Li

(10) Patent No.: US 10,387,680 B2
(45) Date of Patent: *Aug. 20, 2019

(54) MANAGING CONFIDENTIAL INFORMATION

(71) Applicant: Alibaba Group Holding Limited, George Town (KY)

(72) Inventor: Lizhong Li, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/873,548

(22) Filed: Jan. 17, 2018

(65) Prior Publication Data

US 2018/0150652 A1 May 31, 2018

Related U.S. Application Data

(63) Continuation of application No. 15/413,805, filed on Jan. 24, 2017, now Pat. No. 9,922,208, which is a (Continued)

(30) Foreign Application Priority Data

Jun. 12, 2014 (CN) .......................... 2014 1 0262185

(51) Int. Cl.
*H04L 9/00* (2006.01)
*G06F 21/62* (2013.01)
(Continued)

(52) U.S. Cl.
CPC ...... *G06F 21/6263* (2013.01); *G06F 21/6245* (2013.01); *G06K 7/10366* (2013.01);
(Continued)

(58) Field of Classification Search
CPC ....................................................... H04L 63/04
See application file for complete search history.

(56) References Cited

U.S. PATENT DOCUMENTS 7,000,116 B2 2/2006 Bates
7,490,763 B2 2/2009 Keohane
(Continued)

FOREIGN PATENT DOCUMENTS

CN 103401676 11/2013
JP 2001256395 9/2001
(Continued)

*Primary Examiner* — Josnel Jeudy
(74) *Attorney, Agent, or Firm* — Van Pelt, Yi & James LLP

(57) ABSTRACT

Embodiments of the present application relate to a method, apparatus, and system for managing confidential information. The method includes accessing stored target information comprising a public part and a confidential part, wherein an identifier corresponds to the confidential part of the target information, outputting the public part of the target information and the corresponding identifier, wherein the public part of the target information comprises at least first address information, receiving location information and a to-be-recognized identifier, wherein the location information is associated with a current location of a mobile terminal, determining whether the location information is consistent with the first address information, and in the event that the location information is consistent with the first address information, sending the confidential part of the target information associated with the to-be-recognized identifier to the mobile terminal.

19 Claims, 9 Drawing Sheets

Related U.S. Application Data continuation of application No. 14/735,940, filed on Jun. 10, 2015, now Pat. No. 9,589,150.

(51) Int. Cl.
*G06Q 10/08* (2012.01)
*G06Q 50/28* (2012.01)
*G06K 7/10* (2006.01)
*G06K 7/14* (2006.01)
*G06Q 30/06* (2012.01)
*H04L 29/06* (2006.01)
*H04W 12/08* (2009.01)
*H04W 4/02* (2018.01)

(52) U.S. Cl.
CPC ......... *G06K 7/1413* (2013.01); *G06K 7/1417* (2013.01); *G06Q 10/08* (2013.01); *G06Q 30/0601* (2013.01); *G06Q 50/28* (2013.01); *H04L 63/107* (2013.01); *H04W 12/08* (2013.01); *H04W 4/02* (2013.01)

(56) References Cited

U.S. PATENT DOCUMENTS

| | | | |
|---|---|---|---|
| 7,523,316 B2 | 4/2009 | Cheng | |
| 7,591,020 B2 | 9/2009 | Kammer | |
| 7,712,660 B2 | 5/2010 | Keohane | |
| 7,849,511 B2 | 12/2010 | Richardson | |
| 7,945,586 B1 | 5/2011 | Fang | |
| 8,051,490 B2 | 11/2011 | Nomura | |
| 8,656,504 B2 | 2/2014 | Lurey | |
| 8,868,932 B2 | 10/2014 | Lurey | |
| 8,881,240 B1 | 11/2014 | Malik | |
| 2002/0125886 A1 | 9/2002 | Bates et al. | |
| 2005/0262321 A1 | 11/2005 | Iino | |
| 2006/0059016 A1 | 3/2006 | Ogilvie | |
| 2006/0200855 A1 | 9/2006 | Willis | |
| 2006/0224695 A1 | 10/2006 | Willis | |
| 2008/0043689 A1 | 2/2008 | Walter | |
| 2008/0091938 A1 | 4/2008 | Pedersen | |
| 2009/0210700 A1 | 8/2009 | Nomura | |
| 2010/0295679 A1 | 11/2010 | Smith | |
| 2012/0022987 A1 | 1/2012 | Orr | |
| 2013/0111208 A1 | 5/2013 | Sabin | |
| 2013/0191640 A1 | 7/2013 | Bloomer | |
| 2013/0218796 A1 | 8/2013 | Feng | |
| 2014/0115708 A1 | 4/2014 | Terwilliger | |
| 2015/0199538 A1 | 7/2015 | Kritt | |

FOREIGN PATENT DOCUMENTS

| | | |
|---|---|---|
| JP | 2002230117 A | 8/2002 |
| JP | 2003248761 A | 9/2003 |
| JP | 2004240917 A | 8/2004 |
| JP | 2006268500 | 10/2006 |
| JP | 2007018527 | 1/2007 |
| JP | 2009260780 | 11/2009 |
| JP | 2012248027 A | 12/2012 |
| KR | 20130127585 | 11/2013 |
| WO | 03036537 W | 5/2003 |
| WO | WO2014146225 | 9/2014 |

MANAGING CONFIDENTIAL INFORMATION

CROSS REFERENCE TO OTHER APPLICATIONS

This application is a continuation of U.S. patent application Ser. No. 15/413,805, entitled MANAGING CONFIDENTIAL INFORMATION filed Jan. 24, 2017 which is incorporated herein by reference for all purposes, which is a continuation U.S. patent application Ser. No. 14/735,940, entitled MANAGING CONFIDENTIAL INFORMATION filed Jun. 10, 2015, now U.S. Pat. No. 9,589,150, which is incorporated herein by reference for all purposes, which claims priority to People's Republic of China Patent Application No. 201410262185.3 entitled A METHOD OF KEEPING INFORMATION CONFIDENTIAL AND DEVICES ASSOCIATED THEREWITH, filed Jun. 12, 2014 which is incorporated herein by reference for all purposes.

FIELD OF THE INVENTION

The present invention relates to a field of communications technology. In particular, it relates to a method, a client, a server, and a system for managing confidential information.

BACKGROUND OF THE INVENTION

With the rapid development of network technologies, online purchasing has become increasingly widespread. When a buyer places an order for a good or service and makes a payment, the buyer also provides a delivery address, a contact telephone number, and other personal information to the seller. In response to the buyer purchasing the good or service, the seller sends the product by way of a shipping company to the delivery address provided by the buyer.

During and after the transaction process described above, the buyer's personal information can be accessible to the public. For example, the confidential information can easily be leaked through an express waybill or other document that clearly indicates such information. The potential leakage of the confidential information constitutes a threat to the buyer's privacy. For example, harassing phone calls made to the buyer, the delivery of unordered items, or the like.

In summary, the matter of managing confidentiality of buyers' personal information without affecting normal transactions has become a problem. Therefore, there is a need for a method, a device, a server, and a system for managing confidentiality of personal information.

BRIEF DESCRIPTION OF THE DRAWINGS

Various embodiments of the invention are disclosed in the following detailed description and the accompanying drawings.

In order to provide a clearer explanation of the technical schemes in the prior art or in embodiments of the present application, simple introductions are given below to the drawings which are needed to describe embodiments or the prior art. Obviously, persons with ordinary skill in the art could, without expending creative effort, obtain other drawings on the basis of these drawings.

DETAILED DESCRIPTION

Figure 1:
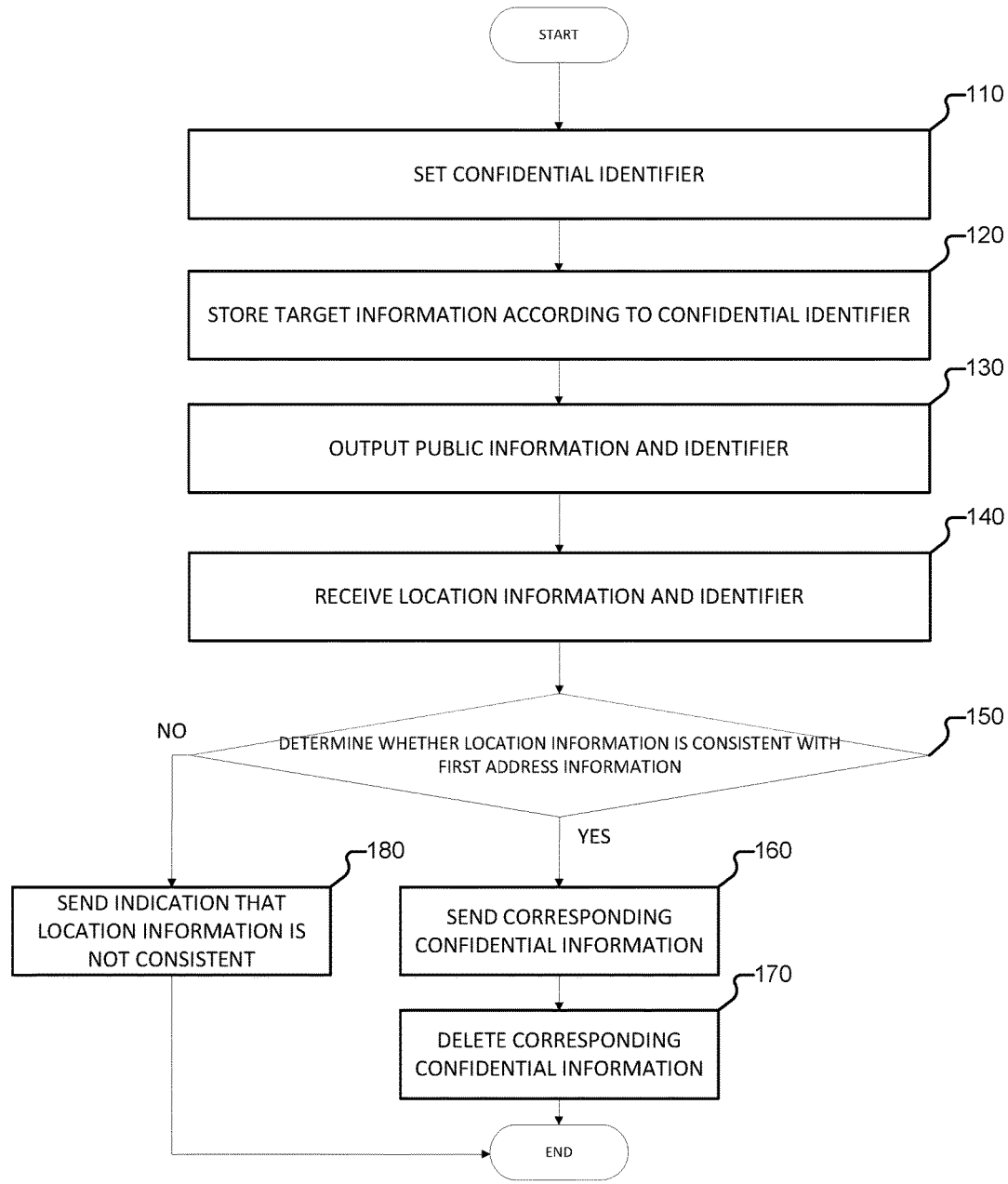
FIG. 1 is a flowchart of a method of managing confidential information according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a terminal generally refers to a device used (e.g., by a user) within a network system and used to communicate with one or more servers. According to various embodiments of the present disclosure, a terminal may include communication functionality. For example, a terminal may be a smart phone, a tablet computer, a mobile phone, a video phone, an e-book reader, a desktop Personal Computer (PC), a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), or the like.

According to some embodiments of the present disclosure, a terminal includes a smart home appliance with communication functionality. A smart home appliance can be, for example, a television, a Digital Video Disk (DVD) player, an audio device, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, or the like.

According to various embodiments of the present disclosure, a terminal can be any combination of the foregoing terminals. In addition, it will be apparent to one having ordinary skill in the art that a terminal according to various embodiments of the present disclosure is not limited to the foregoing terminal.

Various embodiments of the present disclosure include a method, a device, a server, and a system of managing confidential information. For example, various embodiments solve the problem associated with leakage of personal buyer information in connection with an online shopping process.

FIG. 1 is a flowchart of a method of managing confidential information according to various embodiments of the present application.

Referring to FIG. 1, a process 100 for managing confidential information is provided. In some embodiments, process 100 is implemented by a server. For example, process 100 can be implemented by server 500 of FIG. 5, mobile terminal 600 of FIG. 6, and server 800 of FIG. 8. Process 100 can be implemented by server 400 of FIG. 4.

In some embodiments, the target information is divided into two parts: a public part and a confidential part. The server sets an identifier corresponding to each confidential part of target information. Upon dividing the target information into the public part and the confidential part, the server stores the public part of the target information, the confidential part of the target information, and the identifier. The server outputs (e.g., makes public) the public part of the target information and the identifier.

In the example shown, at 110, a confidential identifier is set. In some embodiments, a server sets an identifier (also referred to herein as the confidential identifier) corresponding to the confidential part of target information. The identifier can be a predefined alphanumeric character, a serial number, or the like. The target information can include confidential information that is intended to be maintained as confidential. For example, the target information can correspond to transaction information. The transaction information can be associated with an online purchase (e.g., a purchase by a buyer from an e-commerce website associated with a seller). The portion of the target information that corresponds to the confidential part to which the identifier is set includes personal information of the buyer (e.g., address, name, credit card information, or the like). The portion of target information that is not confidential information is deemed public information. The server can receive the target information in connection with an online transaction. For example, in the event that an online transaction is processed, the server can extract, or otherwise obtain, the target information from the transaction information associated with the online transaction. In some embodiments, part of the address of the buyer is deemed confidential and part of the address of the buyer is deemed public.

At 120, target information is stored. In some embodiments, the server stores the confidential part of the target information, the public part of the target information, and the identifier corresponding to the confidential part of the target information. The corresponding identifier indicates the portion of the target information corresponding to the confidential information.

At 130, the public part of the target information and the identifier is output. In some embodiments, the server outputs the public part of the target information and the identifier. The public part of the target information comprises first address information. In some embodiments, the server outputs the public part and the confidential identifier to a logistics company in connection with shipping or delivery of a product purchased in connection with an online transaction. The server can output the public part of the target information in response to an API or function call. For example, the server can be configured to output only the public part of the target information and the identifier (e.g., and not the confidential part of the target information). The server can use an application to send GPS location information or WiFi location information to a terminal. The public part of the target information and the identifier can be sent from the server to an application on a terminal.

In some embodiments, the target information includes at least valid address information. The valid address information can be divided into two parts: first address information not to be maintained as confidential (e.g., not in need of confidentiality) and second address information to be maintained as confidential (e.g., in need of confidentiality). For example, the server regards the first address information as corresponding to the public part of the target information and the second address information as corresponding to the confidential part of the target information.

In the context of online shopping, after an order is created, the shopping site's server processes the target information provided by the buyer. For example, the server first subjects the target information provided by the buyer to the processing according to 110 and 120 of process 100. The server can provide at least part of the target information to a logistics company in connection with delivery of a product purchased in an online transaction. For example, the seller takes the received target information that was output by the server (e.g., displayed in a user interface screen or printed out as a hardcopy) and the corresponding identifier and enters, or types, the target information into an express waybill for the product, which is transported by a logistics company. In some embodiments, the seller only receives the public part of the target information public part and the corresponding identifier. For example, the seller does not receive the corresponding confidential part of the target information. The buyer's target information is thus kept confidential vis-à-vis the seller.

The target information can include valid address information. The valid address can correspond to the buyer's delivery address. The valid address can be divided into at least two parts: first address information and second address information (also referred to herein as the smaller-unit second address information). So as not to affect normal delivery by the logistics company, the smaller-unit second address information in the delivery address of each order can be regarded as a confidential part of the target information and the remaining first address information can be regarded as a public part of the target information. In some embodiments, only the portions of the address information required by the logistics company to deliver the package to the intended recipient are deemed as public information. The smaller-unit second address information corresponds to the more granular address information relative to other portions of the address information. As an example, the smaller-unit can be a suite number, a room number, an apartment number, a unit number, or the like. For example, in the case of the delivery address "xx province xx city xx district xx road xx no. xx building xx unit xx room," the server can regard the smaller-unit "xx unit xx room" as a confidential part of the target information and set the corresponding identifier to "Z." Accordingly, the server can store the public part of the target information (e.g., "xx province xx city xx district xx road xx no. xx building"), the confidential part of the target information (e.g., "xx unit xx room"), and the identifier Z in correspondence with each other. The server can output the public part of the target information (e.g., "xx province xx city xx district xx road xx no. xx building") and the corresponding identifier Z. For example, the public part of the target information and the corresponding identifier can be output to a logistics company or the like in connection with completion of the order. Please note that the way in which the target information described in this paragraph is partitioned is merely one specific implementation of the present application. The present application is not limited to the approach described above. For example, in the delivery address "xx province xx city xx district xx road xx no. xx building xx unit xx room," "xx road xx no. xx building xx unit xx room" may also be used as the confidential part of the target information and "xx province xx city xx district" as the public part of the target information. In another example, if the delivery address is "room xx, unit xx, building xx, no. xx, road xx, district xx, city xx, province xx," "room xx, unit xx, building xx, no. xx" can be used as the confidential part of the target information and "road xx, district xx, city xx, province xx" can be used as the public part of the target information.

In some embodiments, the server can store the target information in a database or table. The server can store the target information to include mappings of public parts of target information, confidential parts of target information, and corresponding identifiers. For example, the server can store the target information as shown in Table 1.

TABLE 1

Target information and identifier

| Public part of target information (including first address information) | Confidential part of target information (including second address information) | Identifier |
|---|---|---|
| Hebei Province xx city xx district xx road xx no. xx building | Unit 1 Room 202 | Z1 |
| Guangdong Province xx city xx district xx road xx no. xx building | Unit 1 Room 202 | Z2 |
| Beijing City, Chaoyang District, Anding Road, Anhua Development Building | Room 202 | Z3 |
| Beijing City, Chaoyang District, Anding Road, Anhua Development Building | Room 420 | Z4 |
| ... | ... | ... |
| Beijing City, Dongcheng District xx Road xx Building | xx room | Z7, Z8 |
| Apt. A, No. 123 Main Street, San Francisco, CA | Apt. A | Z9 |
| ... | ... | ... |

As can be seen in Table 1, each identifier can uniquely determine one piece of target information. As shown in Table 1, although the confidential parts of the target information corresponding to the identifiers Z1 and Z2 are the same, the corresponding public parts are different. Accordingly, the two target information are not the same. Because the two target information are not the same, the corresponding identifiers are different. By the same logic, although the public parts of the target information corresponding to the identifiers Z3 and Z4 are the same, the corresponding confidential parts are different. Thus, the target information corresponding to the identifiers Z3 and Z4 are different pieces of target information.

In some implementations, two pieces of target information in which both the public parts and the confidential parts are the same can exist. For example, the target information can be the same across multiple pieces of target information in the event that two different orders by the same buyer exist. In some embodiments, a single identifier may be set for the two pieces of target information that have the same public parts and confidential parts. However, in some embodiments, in order to increase confidentiality, different identifiers are set for the two pieces of target information that have the same public parts and confidential parts. Correspondingly, the aforesaid two pieces of target information and the corresponding identifiers can be separately stored, or the two pieces of target information and corresponding identifiers may be merged and stored. For example, the target information "Beijing City, Dongcheng District xx Road xx Building xx Room" in Table 1 has two identifiers Z7 and Z8.

In some embodiments, the target information includes other information in addition to the delivery address, such as buyer name, telephone number, the like, or any combination thereof. To protect the buyer's privacy, the aforesaid buyer name, telephone number, and other information can be regarded as confidential information. The buyer name, the telephone number, and other information can be deemed a confidential part of the target information. For example, the buyer name, the telephone number, and other information can be regarded jointly with the first address information as the confidential part of the target information.

At 140, location information and a corresponding identifier are received. In some embodiments, the server receives the location information and the corresponding identifier from a mobile terminal (e.g., a mobile terminal used by a logistics company's representative). For example, the mobile terminal can acquire location information corresponding to the location at which the mobile terminal is currently located. The mobile terminal can acquire the location information of the current location of the mobile terminal using a Global Positioning Service (GPS) module, an application that is configured to determine the location of the mobile terminal according to the IP address of the mobile terminal, an application that is configured to determine the location of the mobile terminal according to the connection or signals associated with various access points, or any other known technique for obtaining the location. The mobile terminal sends the location information and the corresponding identifier (e.g., a to-be-recognized identifier) to the server. The to-be-recognized identifier is an identifier that the server can recognize (e.g., by searching a database storing mappings of identifiers and target information such as the public part of the target information or the confidential part of target information). The server receive the to-be-recognized identifier and can extract the appropriate information so as to recognize the identifier. The to-be-recognized identifier can be generated by the mobile terminal. For example, the to-be-recognized identifier can include a GPS position information or WiFi position information, and a mobile terminal or a user identifier that is registered with the server. The mobile terminal or user identifier included in the to-be-recognized data can be registered with the server such that server can identify an associated user or mobile terminal in the event that the server receives a message (e.g., the to-be-recognized identifier) including the mobile terminal or user identifier.

The mobile terminal can acquire the identifier from logistic documentation (e.g., an express waybill). For example, a user can input the identifier to the mobile terminal using an application that provides an input interface (e.g., a graphical user interface). In some embodiments, the mobile terminal can capture an image of the logistic documentation and extract the identifier from the logistic documentation. In some embodiments, in the event that the logistic documentation is an electronic object such an electronic document or other file, the mobile terminal can extract the identifier from the logistic documentation. In some embodiments, the mobile terminal acquires the identifier using an image capture module. For example, the mobile terminal can use an image capture module (e.g., a camera) to capture an image of the identifier, and an application executed by the mobile terminal can process the captured image to acquire the identifier. In the event that the identifier is included in a QR code, a barcode, or the like, the identifier can be captured via image captured and the QR code, barcode, or the like can be processed using an application executed by the mobile terminal. In some embodiments, the mobile terminal can acquire the identifier as an attachment in an e-mail, a text message, an instant message, or the like. The identifier can be acquired over a Near Field Communication (NFC) connection, a Bluetooth connection, a WiFi connection, or the like.

In some embodiments, the location information and the corresponding identifier can be sent in conjunction with a user identifier (e.g., an employee identifier, or the like), or the like. For example, the mobile terminal can send information used to authenticate the user. For example, the mobile terminal can be used by a logistics company representative. The logistics company representative can be authenticated before the location information and corresponding identifier are accepted, processed, or the like.

The location information and the corresponding identifiers can be used in connection with completing delivery of an item (e.g., a product purchased via an online transaction). For example, when logistics company delivery personnel are making deliveries, the logistic company can make use of current location information and the corresponding identifiers (i.e., the to-be-recognized identifier) on the express waybill that are uploaded to the server from mobile terminals. A mobile terminal can be configured to use GPS positioning components of the mobile terminal to provide information acquired by the mobile terminals on the current location of the mobile terminal. For example, the mobile terminals can have an application installed thereon that acquires the current location of the mobile terminal (e.g., using GPS positioning components) and sends the location information to the server (contemporaneously with the corresponding identifier, waybill, the like, or any combination thereof)

According to various embodiments of the present disclosure, a more granular portion of a delivery address and other confidential information associated with the delivery are not provided until a logistics company representative is within a threshold proximity (e.g., 100 meters, 10 kilometers, etc.) of the delivery address. The location of the logistics company representative can be confirmed to be within the threshold proximity of the delivery address based on the logistics company representative using a mobile terminal to send the current location of the mobile terminal to the server. The server can determine whether the current location of the mobile terminal is consistent with, or otherwise matches, the delivery address (e.g., the public part of the target information). For example, the server can determine whether the current location of the mobile terminal is within the threshold proximity of the delivery address. In some embodiments, the threshold proximity is configurable by a user such as a seller, a buyer, a recipient, a logistics company, or the like. The threshold proximity can be set according to user or business preferences, according to the type of address (e.g., residential, commercial, rural, or the like) of the delivery address, according to a jurisdiction in which the delivery address is located, the like, or any combination thereof.

At 150, a determination is made as to whether the location information (e.g., the location information received from the mobile terminal that indicates the current location of the mobile terminal) is consistent with the first address information (e.g., the public part of the target information). In some embodiments, the location information can be deemed consistent with the first address information if the location information is the same as the first address information. In some embodiments, the location information can be deemed consistent with the first address information if the location information is in approximately the same location as the first address information (e.g., if the location information is within a threshold proximity of the first address information). In some embodiments, in response to the server receiving the current location information and corresponding identifier from the mobile terminal, the server determines whether the location information is consistent with the first address information. The server can use the identifier received from the mobile terminal in connection with the current location of the mobile terminal to look up the corresponding first address information. For example, the server uses the identifier to search a database or table storing mappings of first address information and identifiers for first address information mapped to the identifier. In the event that the server finds first address information associated with the received identifier, the server determines whether the location information received from the mobile terminal (e.g., the location information indicating the current location of the mobile terminal) matches (e.g., is the same as, or within a threshold proximity of a location corresponding to) the first address information. The server can determine whether the current location of the mobile terminal is the same as the first address information.

In the event that the location information and the first address information are determined to be consistent at 150, then at 160, corresponding confidential information is sent. If the location information and the first address information are consistent (e.g., are the same or within a threshold proximity of each other), then the server can send the confidential part of the target information corresponding to the identifier received in connection with the location information (e.g., the to-be-recognized identifier) to the mobile terminal.

After receiving the location information and the corresponding identifier (e.g., the to-be-recognized identifier), the server searches a local storage or a remote storage for the public part of the target information (e.g., the aforesaid first address information) corresponding to the identifier (e.g., the to-be-recognized identifier received in connection with the location information) and compares the location information with the public part of the target information.

If the location information and the public part of the target information are the same, then the product is already within range (e.g., a threshold proximity) of the address corresponding to the first address information. In some embodiments, in order for the location information and the public part of the target information to be deemed the same, the location information and the public part of the target information need only be the same to a preset granularity. For example, the granularity can require that the location information and the public part of the target information be the same at the district level but does not require that the location information and the public part of the target information be the same at the street level. In addition, if the location information and the public part of the target information are the same, then it can be inferred that the person holding the mobile terminal is a delivery person for the logistics company and not another person in another area. At this point, the server obtains the confidential part of the target information (including the second address information) corresponding to the identifier received in connection with the location information (e.g., the to-be-recognized identifier) and sends the confidential part of the target information to the mobile terminal. Accordingly, the delivery person obtains the entire target information (e.g., including the valid address information formed by combining the first address information and the second address information) and thus successfully delivers the product into the hands of the buyer.

In the event that the location information and the first address information are determined to be not consistent at 150, then at 180, an indication that the location information is not consistent with the first address information is provided. The server can send the indication that the current location of the mobile terminal (e.g., the location associated with the location information) is not consistent with the first address information to the mobile terminal. In response to receiving the indication from the server, the mobile terminal can display, or otherwise provide, the indication. For example, in response to receiving the indication, the mobile terminal can generate an alert and provide the alert to the user (e.g., via a vibration, a display of an icon, a text box, other prompt, an indicator LED, or the like).

If the local information and the first address information are different, then the server does not send the confidential part of the target information to the mobile terminal. The server can send appropriate prompt information such as "address incorrect" to the mobile terminal. In some embodiments, the location information and the first address information are deemed to be different if the location information is not within the threshold proximity of the first address information.

According to various embodiments of the present disclosure, a server sets up an identifier corresponding to the confidential part of the target information, stores the public part of the target information, the confidential part of the target information, and the corresponding identifier, and outputs the public part of the target information and the corresponding identifier. The public part of the target information can include at least first address information. A mobile terminal acquires location information associated with the current location of the mobile terminal, and an identifier (e.g., a to-be-recognized identifier) such as an identifier associated with an online transaction, and sends the location information and the identifier to a server. In response to receiving the location information and the identifier, the server determines whether the location information and the first address information are consistent. If the location information and the first address information are consistent, then the server sends the confidential part of the target information corresponding to the identifier (e.g., the to-be-recognized identifier) to the mobile terminal. In some embodiments, the identifier is used to acquire the corresponding confidential part of the target information when the location information of the mobile terminal is the same as the first address information (e.g., when the delivery person has arrived within the address range corresponding to the first address information). For example, the entire target information (e.g., the public part of the confidential information and the confidential part of the target information) can be acquired (e.g., sent to the mobile terminal) only when the location information of the mobile terminal is within the threshold proximity of the first address information. In some embodiments, neither the seller nor any other personnel involved in the product transportation process may acquire the entire target information. Accordingly, various embodiments achieve confidentiality for the target information. Thus, the privacy of a buyer associated with an online transaction can be protected.

According to various embodiments, even in cases where target information is leaked, responsibility of the leak can generally be traced beginning with the delivery personnel (e.g., because the confidential part of the target information is only sent in response to the delivery personnel being within the threshold proximity of the first address information). The interests of buyers are thus safeguarded.

In some embodiments, the public part of the target information and the confidential part of the target information (and the identifier) are stored via Table 1 within a single storage unit in a server, or in a single location (e.g., the same database) in a remote storage accessible by the server. In some embodiments, the public part of the target information and the confidential part of the target information are stored in different storage units, and the public part and the confidential part that belong to the same target information are respectively associated with a unique number. Accordingly, the public part and the confidential part associated with the same piece of target information can be located according to the unique number mapped to both the public part and the confidential part. Different parts of the same target information can be stored in different storage units or in different databases. As a result, should information in either storage unit (e.g., database) of the server be stolen, only one part of the target information (and not the entire target information) will be disclosed. Thus, the confidentiality of the target information is further improved.

In some embodiments, the number used to relate the public part of the target information and the confidential part of the target information is a transaction order serial number or the like. Tables 2 and 3 below present the form in which target information can be stored in a server. Table 2 provides a form of storage of the public part of the target information, and Table 3 provides a form of storage of the confidential part of the corresponding target information. Tables 2 and 3 can be stored in different storage units or different databases of the server.

TABLE 2

Public part of target information

| Number | Public part of target information |
|---|---|
| 2688000111 | Hebei Province xx city xx district xx road xx no. xx building |
| 2688000112 | Guangdong Province xx city xx district xx road xx no. xx building |
| 2688000113 | Beijing City, Chaoyang District, Anding Road, Anhua Development Building |
| 2688000114 | Beijing City, Chaoyang District, Anding Road, Anhua Development Building |
| ... | ... |
| 2688000117 | Beijing City, Dongcheng District xx Road xx Building |
| ... | ... |

TABLE 3

Confidential part of target information and corresponding identifier

| Number | Confidential part of target information | Identifier |
|---|---|---|
| 2688000111 | Unit 1 Room 202 | Z1 |
| 2688000112 | Unit 1 Room 202 | Z2 |
| 2688000113 | Room 202 | Z3 |
| 2688000114 | Room 420 | Z4 |
| ... | ... | ... |
| 2688000117 | xx room | Z7, Z8 |
| ... | ... | ... |

As shown by Tables 2 and 3, the public part of the target information and the confidential part of the target information that correspond to the same number collectively constitute one piece of valid target information. For example, Hebei Province xx city xx district xx road xx no. xx building and Unit 1 Room 202 are combined to form the target information Hebei Province xx city xx district xx road xx no. xx building Unit 1 Room 202.

Referring to Tables 2 and 3, after receiving the location information and the corresponding identifier (e.g., the to-be-recognized identifier) from the mobile terminal, the method whereby the server acquires the corresponding first address information includes searching for the number corresponding to the received identifier (e.g., the to-be-recognized identifier) in Table 3; and searching for the public part of the target information corresponding to the number in Table 2. The public part of the target information that the server finds is the first address information corresponding to the received identifier (e.g., the to-be-recognized identifier).

In some embodiments, the server sets the identifier corresponding to the confidential part of the target information. The server can set the identifier corresponding to the confidential part of the target information by encoding the confidential part of the target information based on a preset encryption rule so as to obtain the identifier. In some embodiments, different types of identifiers employ different preset encryption rules. For example, a QR code corresponding to the confidential part of the target information can be generated according to a QR code encoding rule. As another example, a barcode corresponding to the confidential part of the target information is generated according to a barcode encoding rule.

In some embodiments, a variety of specific types of identifiers can be implemented depending on the requirements of the system. For example, one or more of the variety of specific types of identifiers may be employed. The types of identifiers can include QR codes, barcodes, radio-frequency identification (RFID) codes, character strings, or the like.

In the event that the identifier is a QR code or a barcode, the seller can directly print the QR code or barcode on logistic documentation (e.g., the express waybill of the product). Correspondingly, the mobile terminal described can be configured to include a specialized scanning module or device, or the mobile terminal can be configured with a corresponding scanning function (e.g., a smart phone may be used to scan a QR code).

In the event that the identifier is a radio-frequency identification code, the seller can attach an electronic tag such as an RFID chip that stores the radio-frequency identification code to the logistic documentation (e.g., the express waybill of the product). Correspondingly, the mobile terminal can be configured as an RFID reader, or the mobile terminal can be configured with a radio-frequency identification function which communicates wirelessly with the RFID chip through an antenna so as to read the stored radio-frequency identification code stored in the RFID chip.

In the event that the identifier is a character string, the seller can directly enter or type the string onto the logistics documentation (e.g., the express waybill of the product). Correspondingly, the string can be input through a physical or virtual keyboard on the mobile terminal. The aforesaid character string can be a numerical string, a Chinese character string, a string of letters, a string of special symbols, or a combination character string that contains at least two of the following: numbers, Chinese characters, letters, and special symbols.

In some embodiments, 170 is performed. In various other embodiments, 170 is omitted. 170 can be performed after 160 of process 100. At 170, the corresponding confidential information is deleted. In the event that the server sent the confidential part of the target information associated with the received identifier (e.g., the to-be-recognized identifier), the server deletes the confidential part of the target information from a database or table storing mappings of confidential parts of target information and identifiers. The server can delete the confidential part of the target information upon receiving confirmation that the confidential part of the target information that was sent (e.g., to the mobile terminal) is received.

Referring to Table 1 as an example, in the event that the server sends the confidential part of the target information "Room 420" corresponding to the identifier Z4 to a mobile terminal at 160, then at 170, the server deletes the confidential part of the target information "Room 420" from the table.

In some embodiments, the server may also delete all information (e.g., target information) relating to the identifier (e.g., to-be-recognized identifier) from the database or table storing the mapping of target information (or portions thereof) to identifiers. The server can contemporaneously delete all information associated with the identifier with deletion of the confidential part of the target information. Referring to Table 1 as an example, when deleting the confidential part of the target information "Room 420," the server also deletes the corresponding target information's public part "Beijing City, Chaoyang District, Anding Road, Anhua Development Building" and the identifier "Z4." In other words, the server deletes the entire fourth line of information in Table 1.

In some embodiments, after sending the confidential part of the target information corresponding to the identifier, the server deletes the confidential part of the target information corresponding to the identifier from the database storing mappings of confidential parts of target information and identifiers. As a result, the mobile terminal cannot again use this identifier to acquire the confidential part of the corresponding target information. Accordingly, the confidentiality of the target information is further increased.

In some embodiments, after the server sends the confidential part of the target information corresponding to the identifier (e.g., to-be-recognized identifier) to a mobile terminal, the server may also regard identifiers that are the same as the identifier received in connection with the current location of the mobile terminal (e.g., the to-be-recognized identifier) in the database including mappings of target information (e.g., confidential parts of target information) and identifiers as invalid identifiers. For example, the database including the mappings of target information and identifiers can include a status field associated with an identifier. After the server has sent the confidential part of the target information corresponding to the identifier (e.g., the to-be-recognized identifier) to the mobile terminal (and receives confirmation of such information from the mobile terminal), the server updates the status field associated with the identifier to indicate that the identifier is invalid. Referring to Table 4, this approach likewise renders the mobile terminal incapable of again using this identifier to acquire the corresponding confidential part of the target information. The confidentiality of the target information is further increased.

TABLE 4

Confidential part of target information and corresponding identifier

| Number | Confidential part of target information | Identifier | Status |
|---|---|---|---|
| 2688000111 | Unit 1 Room 202 | Z1 | Invalid |
| 2688000112 | Unit 1 Room 202 | Z2 | Valid |
| ... | ... | ... | ... |

According to various embodiments, a server sets up an identifier corresponding to the confidential part of target information, stores the public part of the target information, the confidential part of the target information, and the corresponding identifier, and outputs the public part of the target information and the identifier. The public part of the target information at least comprises first address information. A mobile terminal acquires location information associated with a current location of the mobile terminal and an identifier (e.g., a to-be-recognized identifier) and sends the location information and the identifier to a server. The server determines whether the location information and the first address information are consistent. If the location information and the first address information are consistent, then the server sends the confidential part of the target information corresponding to the identifier (e.g., the to-be-recognized identifier) to the mobile terminal. In some embodiments, the server sends the confidential part of the target information to the mobile terminal only when the received mobile terminal location information is the same as the first address information. As a result, the mobile terminal obtains complete target information (e.g., both the public part of the target information and the confidential part of the target information). In some embodiments, neither the seller nor any other personnel involved in the product transportation process can acquire the entire target information. Therefore, various embodiments achieve confidentiality for the target information. The privacy of the buyer can thus be protected in connection with online transactions.

Figure 2:
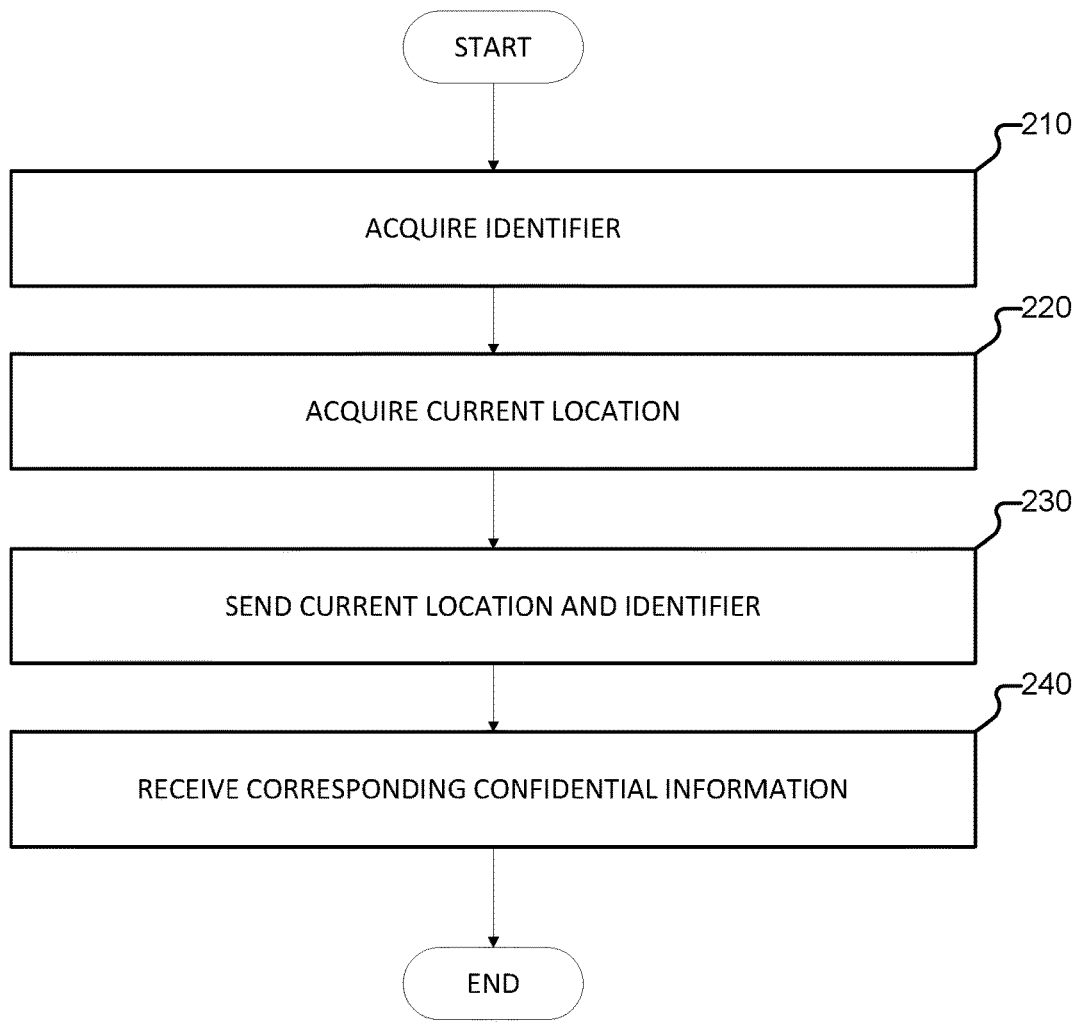
FIG. 2 is a flowchart of a method of managing confidential information according to various embodiments of the present application.

FIG. 2 is a flowchart of a method of managing confidential information according to various embodiments of the present application.

Referring to FIG. 2, a process 200 for managing confidential information is provided. In some embodiments, process 200 is implemented by a terminal. For example, process 200 can be implemented by device 600 of FIG. 6. Process 200 can be implemented by system 300 of FIG. 3.

At 210, an identifier is acquired. In some embodiments, a mobile terminal acquires an identifier associated with target information. For example, the identifier is associated with a transaction. The mobile terminal can acquire the identifier from logistic documentation (e.g., an express waybill). For example, a user can input the identifier recorded on the logistic document to the mobile terminal manually using an interface (e.g., a graphical user interface). In some embodiments, the mobile terminal can be used to capture an image of the logistic documentation and extract the identifier from the logistic documentation (e.g., by scanning a QR code printed on the express waybill). In some embodiments, in the event that the logistic documentation is an electronic object, the mobile terminal can extract the identifier from the logistic documentation. The identifier can be acquired, or otherwise input to, an application (e.g., a package delivery application) installed on the mobile terminal.

At 220, a current location is acquired. For example, the mobile terminal can acquire location information corresponding to the location at which the mobile terminal is currently located. The mobile terminal can acquire the location information of the current location of the mobile terminal using a Global Positioning Service (GPS) module, an application that is configured to determine the location of the mobile terminal according to the IP address of the mobile terminal, an application that is configured to determine the location of the mobile terminal according to the connection or signals associated with various access points, or the like. The current location can be acquired, or otherwise input to, an application (e.g., a package delivery application) installed on the mobile terminal.

At 230, the current location and the acquired identifier are sent. The mobile terminal can send location information indicating a current location of the mobile terminal and the acquired identifier (e.g., the to-be-recognized identifier) to the server. In some embodiments, the location information and the corresponding identifier can be sent in conjunction with a user identifier (e.g., an employee identifier, or the like), or the like. For example, the mobile terminal can send information used to authenticate the user. For example, the mobile terminal can be used by a logistics company representative. The logistics company representative can be authenticated before the location information and corresponding identifier are accepted, processed, or the like.

The location information and the corresponding identifiers can be used in connection with completing delivery of an item (e.g., a product purchased via an online transaction). For example, the mobile terminal can send the location information and the corresponding identifier to a server in order to receive second address information associated with delivery of an item. The second address information can correspond to the confidential part of the target information associated with the identifier.

At 240, corresponding confidential information is received. The mobile terminal can receive the confidential part of target information corresponding to the identifier (e.g., the to-be-recognized identifier) that the mobile terminal sent at 230. In response to receiving the confidential information, the mobile terminal can provide the confidential part of the target information. For example, the mobile terminal can extract the confidential part of the target information corresponding to the identifier, and display the confidential part of the target information. In some embodiments, the mobile terminal can invoke an application that generates directions from the current location of the mobile terminal to a location corresponding to the confidential part of the target information. In some embodiments, the mobile terminal can display an indicator associated with a location corresponding to the confidential part of the target information on a map.

In the event that the location information and the first address information associated with the identifier are not determined to be consistent, the mobile terminal can receive, from the server, an indication that the location information is not consistent with the first address information. In response to receiving the indication from the server, the mobile terminal can display, or otherwise provide, the indication. For example, in response to receiving the indication, the mobile terminal can generate an alert and provide the alert to the user (e.g., via a vibration, a display of an icon or other prompt, an indicator LED, or the like).

In some embodiments, the identifier comprises at least one of the following: a QR code, a barcode, a radio-frequency identification code, a character string, or the like.

In some embodiments, the confidential part of the target information comprises second address information. A combination of the first address information and the second address can correspond to valid address information in the target information.

Figure 3:
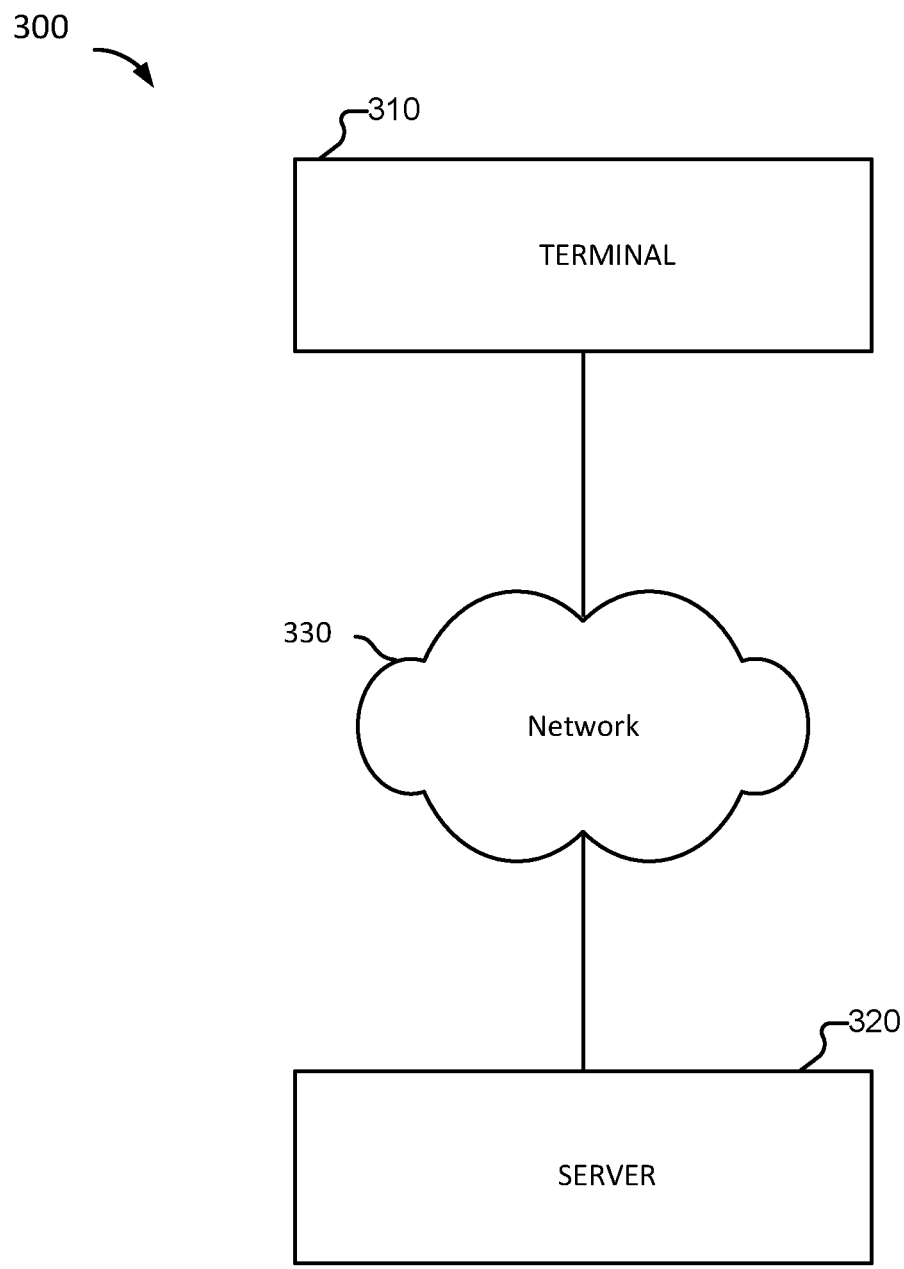
FIG. 3 is a structural diagram of a system for managing confidential information according to various embodiments of the present application.

FIG. 3 is a structural diagram of a system for managing confidential information according to various embodiments of the present application.

Referring to FIG. 3, a system 300 for managing confidential information is provided. The system can implement process 100 of FIG. 1 or process 200 of FIG. 2.

System 300 includes a terminal 310 and a server 320. The terminal 310 can be a mobile terminal used to implement process 200 of FIG. 2. The server 320 can be a server used to implement process 100 of FIG. 1.

In some embodiments, system 300 includes a network 330 over which the terminal 310 and the server 320 communicate. In some embodiments, the terminal 310 logs into the server 320. For example, the server 320 hosts an application or an application system to which the terminal (e.g., a current user) logs in. The server 320 can authenticate the terminal 310 (or a user thereof). In the event that the terminal 310 is authenticated, the terminal 310 can receive confidential information from the server 320. For example, the terminal 310 can receive the confidential part of target information corresponding to an identifier from the server 320.

Figure 4:
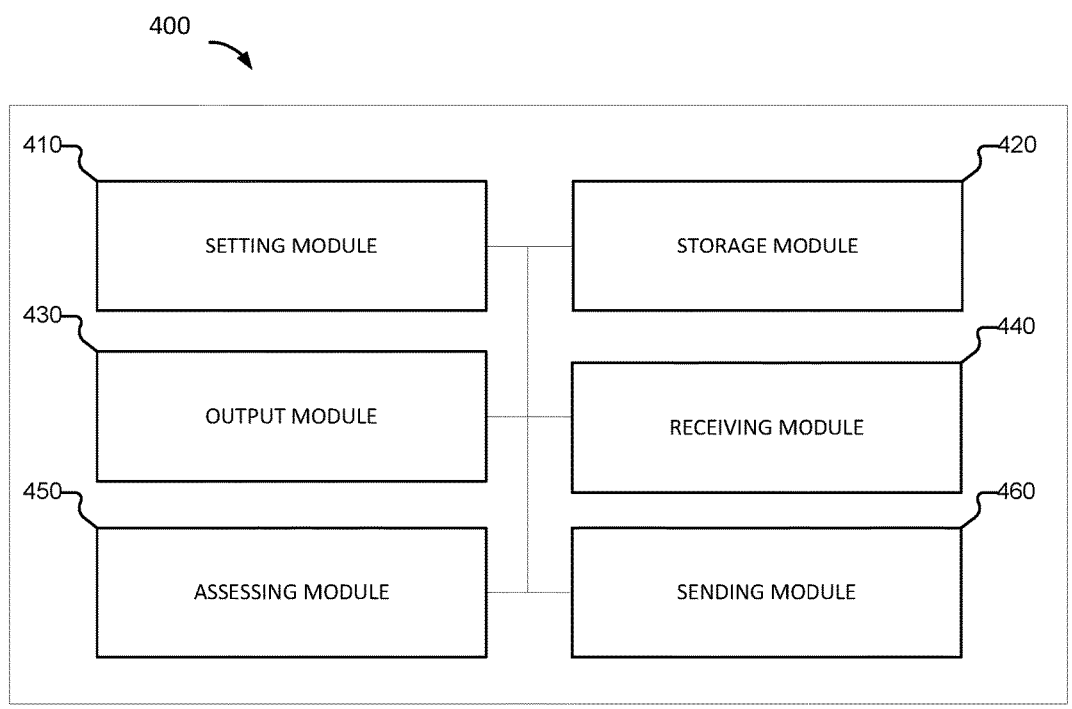
FIG. 4 is a structural block diagram of a server according to various embodiments of the present application.

FIG. 4 is a structural block diagram of a server according to various embodiments of the present application.

Referring to FIG. 4, a server 400 for managing confidential information is provided. Server 400 can implement process 100 of FIG. 1. Server 400 can be implemented by system 300 of FIG. 3.

Server 400 includes a setting module 410, a storage module 420, an output module 430, a receiving module 440, an assessing module 450, and a sending module 460.

The setting module 410 is configured to set an identifier corresponding to the confidential part of the target information. The corresponding identifier indicates the portion of the target information corresponding to the confidential information. For example, the corresponding identifier indicates the bifurcation between confidential information and public information among the target information. The server 400 can receive the target information in connection with an online transaction. For example, in the event that an online transaction is processed, the server 400 can extract, or otherwise obtain, the target information from the transaction information associated with the online transaction.

The storage module 420 is configured to store the public part of the target information, the confidential part of the target information, and the identifier corresponding to the confidential part of the target information. The public part of the target information at least comprises first address information.

The output module 430 is configured to output the public part of the target information and the identifier. In some embodiments, the server outputs the public part and the confidential identifier to a logistics company in connection with shipping or delivery of a product purchased in connection with an online transaction. The output module 430 can output the public part of the target information in response to an API or function call. For example, the output module 430 can be configured to output only the public part of the target information and the identifier (e.g., and not the confidential part of the target information).

The receiving module 440 is configured to receive the location information corresponding to a current location of a mobile terminal and an identifier (e.g., to-be-recognized identifier) sent by the mobile terminal.

The assessing module 450 is configured to determine whether the location information is consistent with the first address information. In some embodiments, the location information can be deemed consistent with the first address information if the location information is the same as the first address information. In some embodiments, the location information can be deemed consistent with the first address information if the location information is in approximately the same location as the first address information (e.g., if the location information is within a threshold proximity of the first address information). The assessing module 450 can use the identifier received from the mobile terminal in connection with the current location of the mobile terminal to look up the corresponding first address information. For example, the assessing module 450 uses the identifier to search a database or table storing mappings of first address information and identifiers for first address information mapped to the identifier. In the event that the assessing module 450 finds first address information associated with the received identifier, the assessing module 450 determines whether the location information received from the mobile terminal (e.g., the location information indicating the current location of the mobile terminal) matches (e.g., is the same as, or within a threshold proximity of a location corresponding to) the first address information. The assessing module 450 can determine whether the current location of the mobile terminal is the same as the first address information.

The sending module 460 is configured to send the confidential part of the target information corresponding to the identifier (e.g., the to-be-recognized identifier) to the mobile terminal if the location information and the first address information are consistent.

Figure 5:
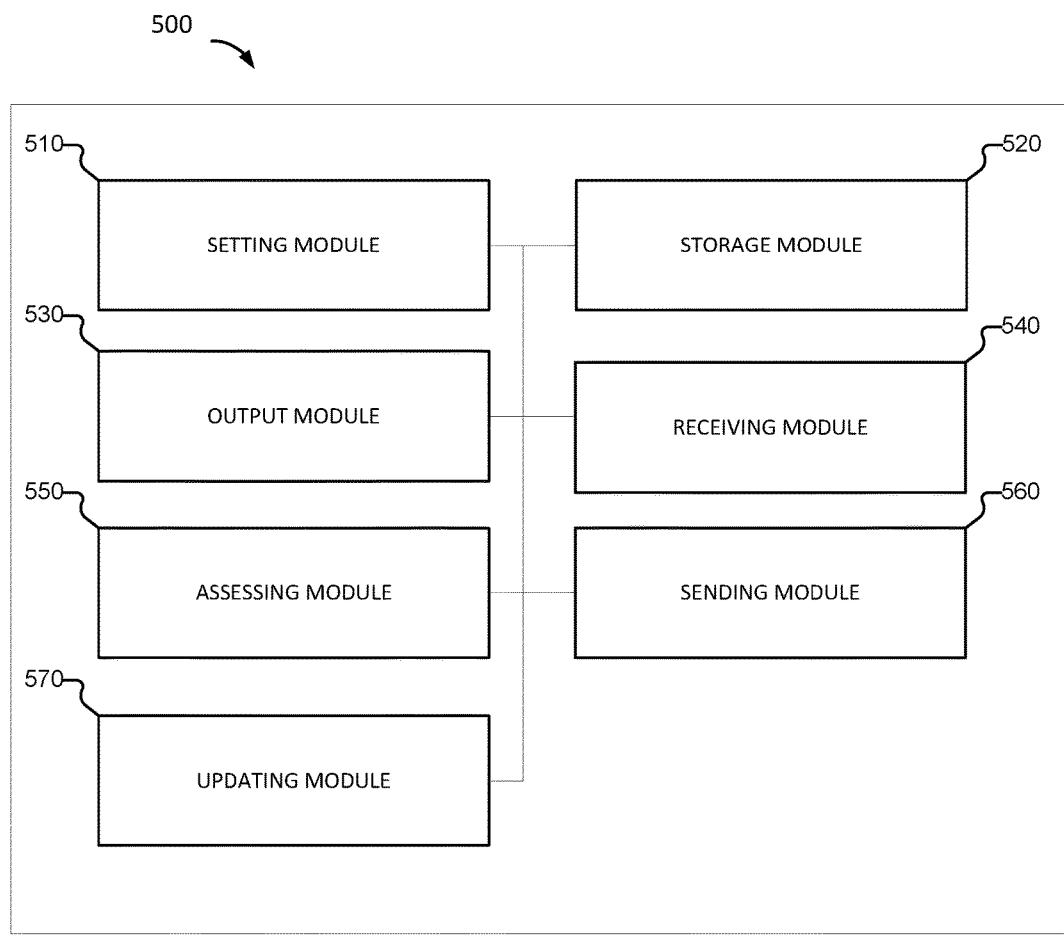
FIG. 5 is a structural block diagram of a server according to various embodiments of the present application.

FIG. 5 is a structural block diagram of a server according to various embodiments of the present application.

Referring to FIG. 5, a server 500 for managing confidential information is provided. Server 500 can implement process 100 of FIG. 1. Server 500 can be implemented by system 300 of FIG. 3.

Server 500 includes a setting module 510, a storage module 520, an output module 530, a receiving module 540, an assessing module 550, a sending module 560, and an updating module 570.

The setting module 510 is configured to set an identifier corresponding to the confidential part of the target information. The corresponding identifier indicates the portion of the target information corresponding to the confidential information. For example, the corresponding identifier indicates the bifurcation between confidential information and public information among the target information. The server 500 can receive the target information in connection with an online transaction. For example, in the event that an online transaction is processed, the server 500 can extract, or otherwise obtain, the target information from the transaction information associated with the online transaction.

The storage module 520 is configured to store the public part of the target information, the confidential part of the target information, and the corresponding identifier. The public part of the target information at least comprises first address information.

The output module 530 is configured to output the public part of the target information and the identifier. In some embodiments, the server outputs the public part and the confidential identifier to a logistics company in connection with shipping or delivery of a product purchased in connection with an online transaction.

The receiving module 540 is configured to receive the location information corresponding to a current location of a mobile terminal and an identifier (e.g., to-be-recognized identifier) sent by the mobile terminal.

The assessing module 550 is configured to determine whether the location information is consistent with the first address information. The assessing module 550 can use the identifier received from the mobile terminal in connection with the current location of the mobile terminal to look up the corresponding first address information. For example, the assessing module 550 uses the identifier to search a database or table storing mappings of first address information and identifiers for first address information mapped to the identifier. In the event that the assessing module 550 finds first address information associated with the received identifier, the assessing module 550 determines whether the location information received from the mobile terminal (e.g., the location information indicating the current location of the mobile terminal) matches the first address information. The assessing module 550 can determine whether the current location of the mobile terminal is the same as the first address information.

The sending module 560 is configured to send the confidential part of the target information corresponding to the identifier (e.g., the to-be-recognized identifier) to the mobile terminal if the location information and the first address information are consistent.

The updating module 570 is configured to delete the confidential part of the target information corresponding to the identifier (e.g., the to-be-recognized identifier) from a database or table storing mappings of confidential parts of target information and identifiers. The updating module 570 can delete the confidential part of the target information upon receiving confirmation that the confidential part of the target information that was sent (e.g., to the mobile terminal) is received.

Figure 6:
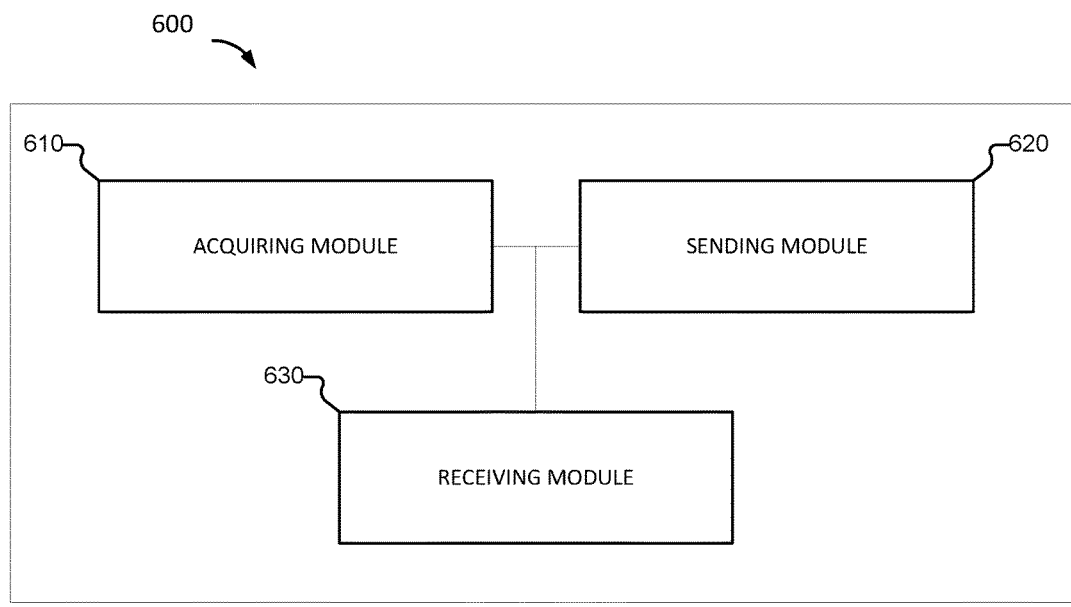
FIG. 6 is a structural block diagram of a mobile terminal according to various embodiments of the present application.

FIG. 6 is a structural block diagram of a mobile terminal according to various embodiments of the present application.

Referring to FIG. 6, a mobile terminal 600 is provided. Mobile terminal 600 can implement process 200 of FIG. 2. Mobile terminal 600 can be implemented in system 300 of FIG. 3.

Mobile terminal 600 includes an acquiring module 610, a sending module 620, and a receiving module 630.

The acquiring module 610 is configured to acquire location information corresponding to the current location of the mobile terminal and an identifier (e.g., the to-be-recognized identifier). The acquiring module 610 can acquire the identifier from logistic documentation (e.g., an express waybill). For example, a user can input the identifier recorded on the logistic document to the mobile terminal 600 manually using an interface (e.g., a graphical user interface) and the acquiring module 610 can communicate with the interface to acquire the identifier. In some embodiments, the acquiring module 610 can be used to capture an image of the logistic documentation (e.g., by invoking a camera function of a camera on the mobile terminal 600) and extract the identifier from the logistic documentation. In some embodiments, in the event that the logistic documentation is an electronic object, the acquiring module 610 can extract the identifier from the logistic documentation (e.g., by scanning a QR code printed on the express waybill). The acquiring module 610 can acquire the location information of the current location of the mobile terminal using a Global Positioning Service (GPS) module, an application that is configured to determine the location of the mobile terminal according to the IP address of the mobile terminal, an application that is configured to determine the location of the mobile terminal according to the connection or signals associated with various access points, or the like.

The sending module 620 is configured to send the location information and the identifier (e.g., the to-be-recognized identifier) to a server. In some embodiments, the sending module 620 can send the location information and the corresponding identifier in conjunction with a user identifier (e.g., an employee identifier, or the like), or the like. For example, the sending module 620 can send information used to authenticate the user. For example, the mobile terminal 600 can be used by a logistics company representative.

The receiving module 630 is configured to receive the confidential part of the target information from the server. The server determines whether the location information and the first address information in the public part of the target information are consistent. If the location information and the first address information are consistent, the server sends the confidential part of the target information corresponding to the to-be-recognized identifier to mobile terminal 600.

In response to receiving the confidential information, mobile terminal 600 can provide the confidential part of the target information. For example, mobile terminal 600 can extract the confidential part of the target information corresponding to the identifier, and display the confidential part of the target information. In some embodiments, mobile terminal 600 can invoke an application that generates directions from the current location of mobile terminal 600 to a location corresponding to the confidential part of the target information. In some embodiments, mobile terminal 600 can display an indicator associated with a location corresponding to the confidential part of the target information on a map.

Figure 7:
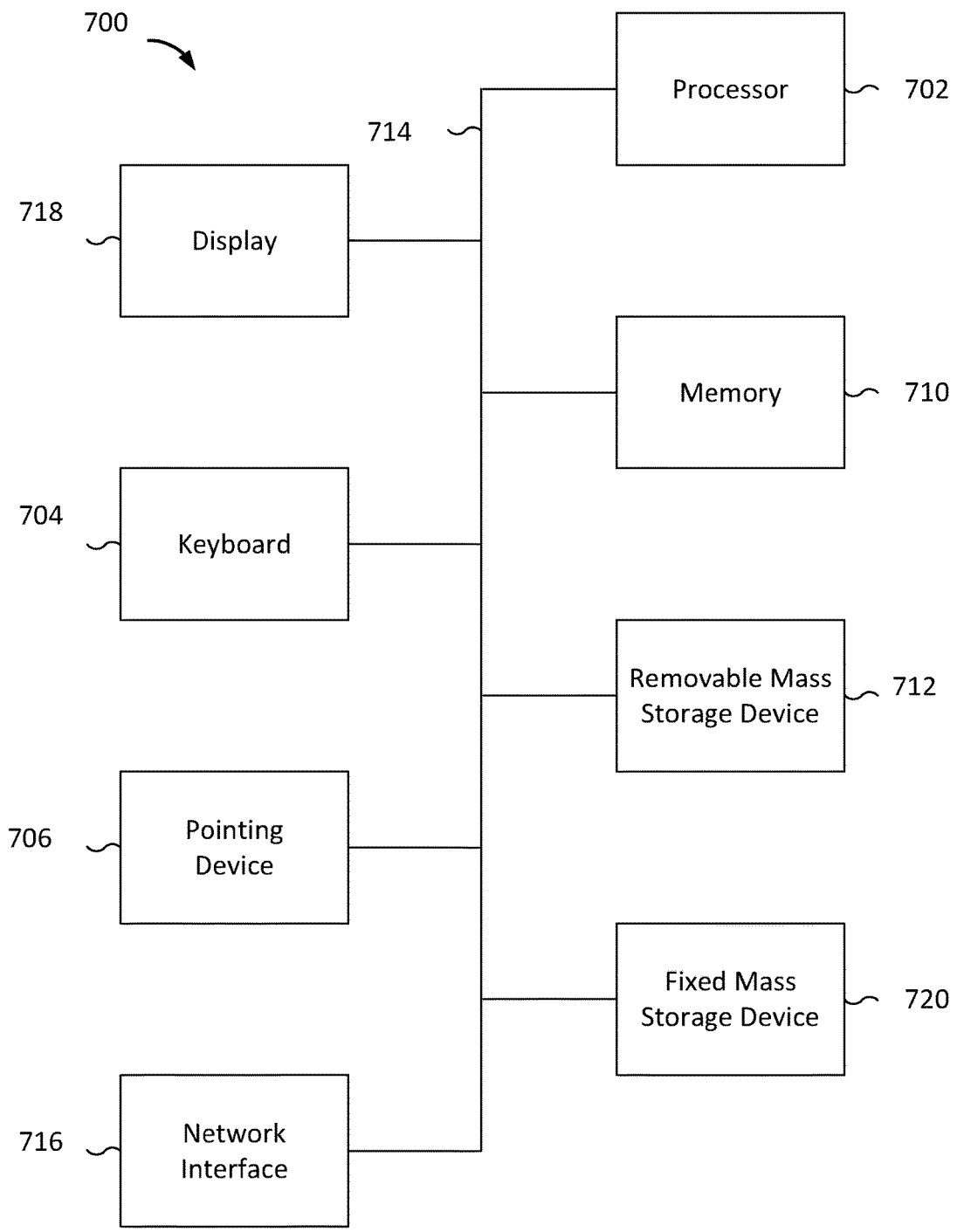
FIG. 7 is a functional diagram of a computer system for managing confidential information according to various embodiments of the present application.

FIG. 7 is a functional diagram of a computer system for managing confidential information according to various embodiments of the present application.

Referring to FIG. 7, a computer system 700 for processing call requests is provided. As will be apparent, other computer system architectures and configurations can be used to implement video calls. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718).

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown). The memory can be a non-transitory computer-readable storage medium.

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storage device 712 and fixed mass storage 720 generally store additional programming instructions, data, and the like that typically are not in active use by the processor 702. It will be appreciated that the information retained within mass storage device 712 and fixed mass storage 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

Figure 8:
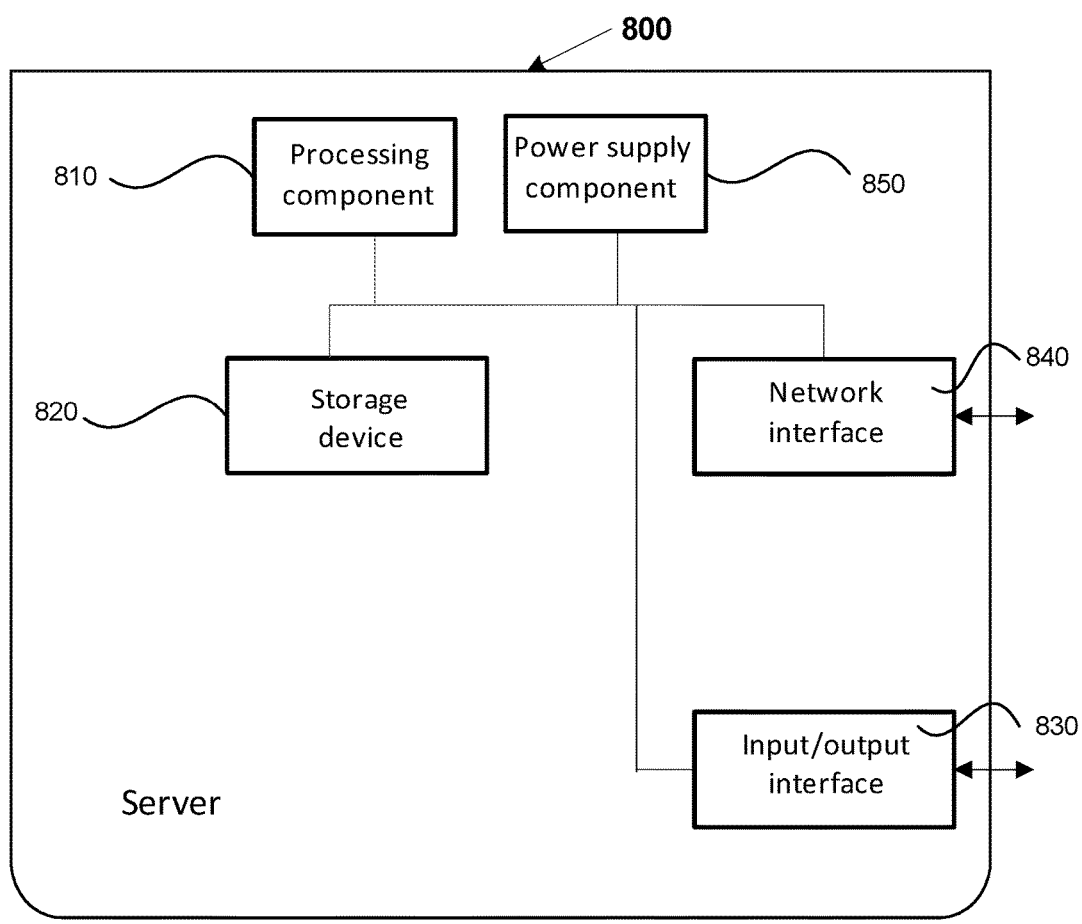
FIG. 8 is a structural block diagram of a server according to various embodiments of the present application.

FIG. 8 is a structural block diagram of a server according to various embodiments of the present application.

Referring to FIG. 8, a server 800 for managing confidential information is provided. Server 800 can implement process 100 of FIG. 1. Server 800 can be implemented by system 300 of FIG. 3

The server 800 comprises a processing component 810, which further comprises one or more processors, and storage resources represented by the storage device 820 which are for storing instructions (e.g., application programs) that can be executed by the processing component 820. The application programs stored in the storage device 820 may include one or more modules each of which corresponds to a set of instructions. In addition, the processing component 810 is configured to execute instructions so as to execute the aforesaid method of managing confidential information.

The server 800 can also include a power supply component 850, a network interface 840, and an input-output interface 830. The power supply component 850 is configured to execute power supply management for the server 800. The network interface 840 can be a wired network interface or a wireless network interface 840, which is configured to connect the server 800 to a network. The server 800 can operate based on an operating system, such as Windows Server™, Mac OS X™, Unix™, Linux™, FreeBSD™, or the like, which is stored in the storage device 820.

In some embodiments, the server 800 includes a non-transitory computer-readable storage medium that includes instructions (e.g., the storage device 820 in the server 800). The aforesaid instructions can be executed by a server 800 processor so as to complete a method such as process 100 of FIG. 1 described above. As an example, the non-transitory computer-readable storage medium can be ROM, random-access memory (RAM), CD-ROM, magnetic tape, floppy disk, or an optical data storage device.

In the event that the instructions in the non-transitory computer-readable medium are executed by the server 800 processor, the server 800 becomes capable of executing a method for managing confidential information. The method includes accessing stored target information comprising a public part and a confidential part, and an identifier corresponding to the confidential part of the target information, outputting the public part of the target information and the corresponding identifier, wherein the public part of the target information comprises at least first address information, receiving location information and a to-be-recognized identifier, wherein the location information is associated with a current location of a mobile terminal, determining whether the location information is consistent with the first address information, and in the event that the location information is consistent with the first address information, sending the confidential part of the target information associated with the to-be-recognized identifier to the mobile terminal.

In some embodiments, the method further comprises: after sending the confidential part of the target information corresponding to the to-be-recognized identifier to the mobile terminal, deleting at least the confidential part of the target information corresponding to the to-be-recognized identifier from a database that includes mappings of confidential parts of target information and identifiers.

Figure 9:
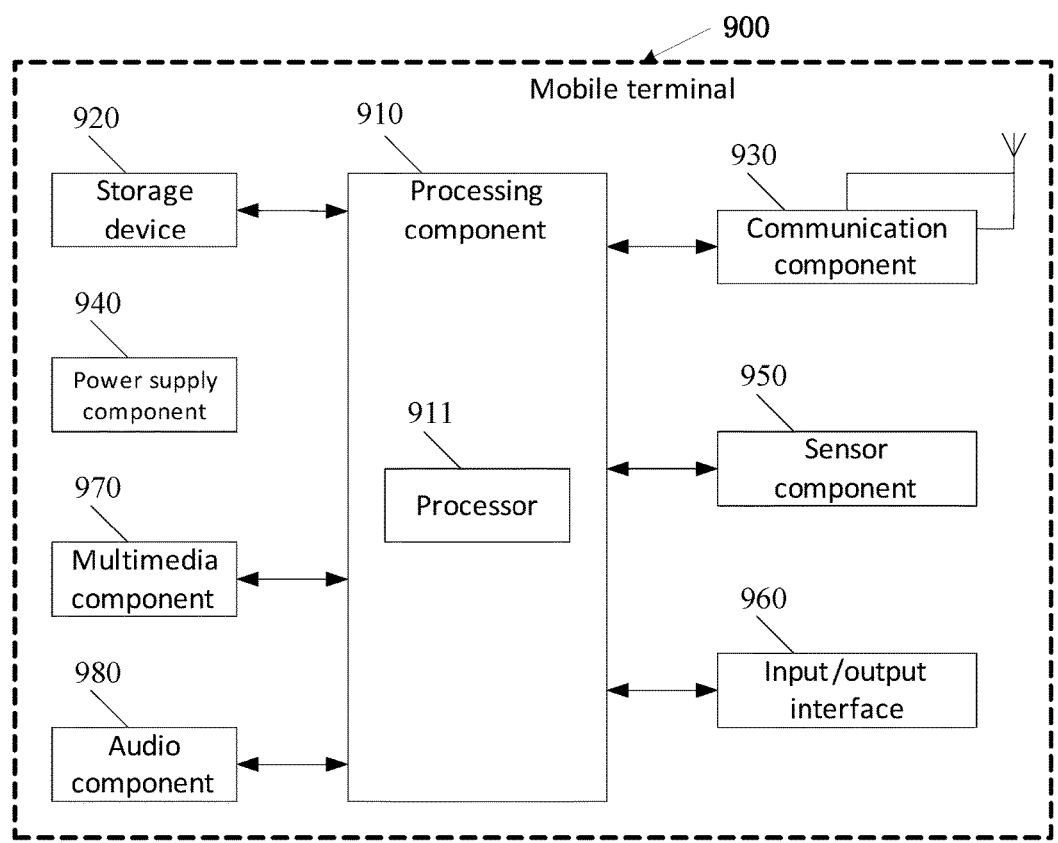
FIG. 9 is a structural block diagram of a mobile terminal according to various embodiments of the present application.

FIG. 9 is a structural block diagram of a mobile terminal according to various embodiments of the present application.

Referring to FIG. 9, a mobile terminal 900 is provided. Mobile terminal 900 can implement process 200 of FIG. 2. Mobile terminal 900 can be implemented in system 300 of FIG. 3.

The mobile terminal 900 provided by the embodiment of the present application may comprise the following one or more components: a processing component 910, a storage device 920, a communication component 930, a power supply component 940, a sensor 950, an input/output (I/O) interface 960, a multimedia component 970, and an audio component 980.

The processing component 910 generally controls overall operations of the mobile terminal, such as operations relating to display, telephone calls, data communications, camera operations, and recording operations. The processing component 910 can comprise one or more processors 911 for executing local or remote instructions so as to complete all or some of the steps of the method described above in the aforesaid embodiment. In addition, the processing component 910 can comprise one or more modules to facilitate interaction between the processing component 910 and other components. For example, the processing component 910 can comprise a multimedia module to facilitate interactions between the multimedia component 970 and the processing component 910.

The storage device 920 may be configured to store various types of data to support operations on the mobile terminal. Examples of this data include the instructions of any application program or method used in mobile terminal operations, contact data, telephone directory data, messages, pictures, and video. The storage device 920 can be any type of volatile or non-volatile storage device or combination thereof, such as static random access memory (SRAM), electrically erasable programmable read-only memory (EEPROM), erasable programmable read-only memory (EPROM), programmable read-only memory (PROM), read-only memory (ROM), magnetic storage, flash memory, magnetic disks, or optical disks.

The communication component 930 is configured to facilitate wired or wireless communication between said mobile terminal and other devices. The mobile terminal can access wireless networks based on a communications standard such as WiFi, 2G, 3G, or combinations thereof. In some embodiments, the communication component 930 receives via broadcast channels broadcast signals or broadcast-related information from external broadcast management systems. In some embodiments, the communication component 930 further comprises a near-field communication (NFC) module for promoting short-range communication. For example, the short-range communications can be achieved in the NFC module on the basis of radio-frequency identification (RFID) technology, Infrared Data Association (IrDA) technology, ultra-wide band (UWB) technology, Bluetooth technology, and other technology.

The power supply component 940 provides electric power to the various components of the mobile terminal. The power supply 940 can include a power supply management system, one or more power supplies, and other components related to generating, managing, and allocating power to the mobile terminal.

The sensor component 950 comprises one or more sensors and is used to provide status evaluations of various aspects of the mobile terminal. For example, the sensor component 950 can detect the power on/off status of the terminal and the relative positioning of components (the display and small keyboard of the mobile terminal). The sensor component 950 can further detect changes in the position of the mobile terminal or of a component of the mobile terminal, contact or non-contact between a user and the mobile terminal, the orientation or acceleration/deceleration of the mobile terminal, and changes in the temperature of the mobile terminal. The sensor component 950 can comprise a near sensor which is configured to detect the presence of a nearby object when there is no physical contact. The sensor component 950 can further comprise an optical sensor, such as a CMOS or CCD image sensor for use in imaging applications. In some embodiments, the sensor component 950 can further comprise an acceleration sensor, a gyroscopic sensor, a magnetic sensor, a pressure sensor, or a temperature sensor. In some embodiments, the sensor component 950 can further comprise a front camera and/or rear camera. In the event that the said mobile terminal is in operating mode, such as a picture-taking mode or a video mode, the front camera and/or rear camera can receive external data. Each front camera and rear camera can be a fixed optical lens system or have focusing and optical zoom capabilities.

The input/output component 960 provides an interface between the processing component 910 and peripheral interface modules. The aforesaid peripheral interface modules may be keyboards, click wheels, buttons, etc. These buttons may include but are not limited to: homepage button, volume button, start button, and lock button.

The multimedia component 970 comprises an output interface screen provided between said mobile terminal and the user. In some embodiments, the screen comprises a liquid crystal display (LCD) or a touch panel (TP). If the screen comprises a touch panel, the screen may be implemented as a touchscreen to receive input signals from the user. The touch panel comprises one or more touch sensors to detect touches, sliding actions, and gestures on the touch panel. The touch sensor can not only detect the boundaries of touch or slide actions, but also can measure duration and pressure related to the touch or slide operations.

The audio component 980 is configured to output and/or input audio signals. For example, the audio component 980 includes a microphone (MIC). When the mobile terminal is in an operating mode (e.g., when in calling mode, recording mode, or speech recognition mode), the microphone is configured to receive external audio signals. The received audio signals can be further stored in the storage device 920 or sent by the communication component 930. In some embodiments, the audio component 980 further comprises a speaker for output of audio signals.

In some embodiments, the mobile terminal can be realized by one or more application-specific integrated circuits (ASIC), digital signal processors (DSP), digital signal processing devices (DSPD), programmable logic devices (PLD), field-programmable gate arrays (FPGA), controllers, micro-controllers, microprocessors, or other electronic components for executing the method described above.

In some embodiments, the mobile terminal 900 includes a non-transitory computer-readable storage medium that includes instructions (e.g., the storage device 920). The aforesaid instructions may be executed by the processor 911 of a mobile terminal so as to complete the method described above. For example, the non-transitory computer-readable storage medium may be ROM, random-access memory (RAM), CD-ROM, magnetic tape, floppy disk, or an optical data storage device.

In the event that the instructions in said non-transitory computer-readable medium are executed by the mobile terminal processor, the mobile terminal becomes capable of executing a method associated with managing confidential information. The method can include acquiring an identifier corresponding to a confidential part of target information stored by a server, wherein a public part of the target information stored by the server comprises at least first address information, acquiring location information, wherein the location information is associated with a current location of a mobile terminal, sending the location information and the identifier to the server, and in response to the server determining whether the location information is consistent with the first address information, receiving the confidential part of the target information associated with the identifier.

The above-stated are merely embodiments of the present application and do not limit the present application. For persons skilled in the art, the present application may have various modifications and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   obtaining, by a server, stored information comprising a first part and a second part, wherein the stored information is stored in connection with an online transaction, and in association with an identifier corresponding to the stored information;
   outputting, by a server, the first part of the stored information;
   obtaining, by a server, to-be validated information;
   validating, by a server, the to-be validated information based at least in part on the first part of the stored information;
   determining, by a server, that at least one condition is satisfied; and
   in response to the at least one condition being satisfied, providing, by a server, the second part of the stored information to a terminal, wherein the at least one condition comprises the to-be validated information is determined to be validated.

2. The method of claim 1, further comprising:
   obtaining, by a server, a to-be-recognized identifier,
   wherein the validating of the to-be validated information comprises:
      obtaining the first part of the stored information based at least in part on the to-be recognized identifier, and
      determining whether the to-be validated information is consistent with at least the obtained first part of the obtained information.

3. The method of claim 1, wherein the identifier uniquely identifies stored information associated with a particular online transaction.

4. The method of claim 1, wherein the first part of the stored information comprises at least first address information.

5. The method of claim 1, wherein the to-be validated information is associated with a current context of the terminal.

6. The method of claim 5, wherein the to-be validated information is associated with a current location of the terminal.

7. The method of claim 6, wherein the first part of the stored information comprises at least first address information, wherein the to-be validated information comprises location information, and wherein the validating the to-be validated information based at least in part on the first part of the obtained stored information comprises:
   determining whether the location information is within a threshold proximity of a location corresponding to the first address information.

8. The method of claim 6, wherein the first part of the stored information comprises at least first address information, wherein the second part of the stored information comprises at least second address information; and wherein a combination of the first address information of the stored information and the second address information of the stored information corresponds to valid address information.

9. The method of claim 8, wherein the first address information corresponds to a broader location than the second address information.

10. The method of claim 1, further comprising:
    after sending the second part of the stored information corresponding to the to-be-recognized identifier to the mobile terminal, deleting at least the second part of the stored information corresponding to the to-be-recognized identifier from a database that includes mappings of second parts of information and identifiers.

11. The method of claim 1, wherein the identifier comprises at least one of the following: a Quick Response (QR) code, a barcode, a radio-frequency identification code, or a character string.

12. The method of claim 1, further comprising:
    setting the identifier corresponding to the second part of the information, wherein the setting of the identifier comprises encoding the second part of the information according to a preset encryption rule to obtain the identifier.

13. The method of claim 1, wherein the obtaining of the to-be validated information comprises receiving the to-be validated information from the terminal.

14. The method of claim 1, further comprising:
    after sending the second part of the stored information corresponding to the to-be-recognized identifier to the mobile terminal, rendering the second part invalid for a subsequent use of the second part in connection with a delivery associated with the online transaction.

15. The method of claim 1, wherein the server ensures that the second part of the stored information to a mobile terminal is used in connection with a single a validation of the to-be validated information.

16. A server, comprising:
at least one processor configured to:
  obtain stored information comprising a first part and a second part, wherein the stored information is stored in connection with an online transaction, and in association with an identifier corresponding to the stored information;
  output the first part of the stored information;
  obtain to-be validated information;
  validate the to-be validated information based at least in part on the first part of the stored information;
  determine that at least one condition is satisfied; and
  in response to the at least one condition being satisfied, provide the second part of the stored information to a terminal based at least on one condition determined to be satisfied, wherein the at least one condition comprises the to-be validated information is determined to be validated; and
a memory coupled to the at least one processor and configured to provide the at least one processor with instructions.

17. A computer program product, the computer program product being embodied in a non-transitory computer readable storage medium and comprising computer instructions for:
  obtaining stored information comprising a first part and a second part, wherein the stored information is stored in connection with an online transaction, and in association with an identifier corresponding to the stored information;
  outputting the first part of the stored information;
  obtaining to-be validated information;
  validating the to-be validated information based at least in part on the first part of the obtained stored information;
  determining, by a server, that at least one condition is satisfied; and
  in response to the at least one condition being satisfied, providing, by a server, the second part of the stored information to a terminal, wherein the at least one condition comprises the to-be validated information is determined to be validated.

18. The method of claim 1, wherein in response to a determination that the at least one condition is not satisfied, the server restricts access to the second part of the stored information by the terminal.

19. The method of claim 1, further comprising: in response to a determination that the at least one condition is not satisfied, providing, by the server, an indication that the at least one condition is not satisfied, the indication being provided to a terminal.

* * * * *

UNITED STATES PATENT AND TRADEMARK OFFICE
CERTIFICATE OF CORRECTION

PATENT NO. : 10,387,680 B2
APPLICATION NO. : 15/873548
DATED : August 20, 2019
INVENTOR(S) : Lizhong Li Page 1 of 1

It is certified that error appears in the above-identified patent and that said Letters Patent is hereby corrected as shown below:

In the Claims

In Column 24, Line 11, delete "obtained" and insert --stored--, therefor.

Signed and Sealed this
Thirtieth Day of June, 2020

Andrei Iancu
*Director of the United States Patent and Trademark Office*